United States Patent
Krolski et al.

(10) Patent No.: US 9,694,758 B1
(45) Date of Patent: Jul. 4, 2017

(54) TILTABLE HAULING DEVICE

(71) Applicant: Discount Ramps.com, LLC, West Bend, WI (US)

(72) Inventors: Robert Krolski, West Bend, WI (US); Richard Beilstein, West Bend, WI (US)

(73) Assignee: Discount Ramps.com, LLC, West Bend, WI (US)

( * ) Notice: Subject to any disclaimer, the term of this patent is extended or adjusted under 35 U.S.C. 154(b) by 0 days.

(21) Appl. No.: 15/072,791

(22) Filed: Mar. 17, 2016

(51) Int. Cl.
*B60R 9/06* (2006.01)
*B60P 1/28* (2006.01)
*B60P 1/273* (2006.01)

(52) U.S. Cl.
CPC ............... *B60R 9/06* (2013.01); *B60P 1/273* (2013.01); *B60P 1/28* (2013.01)

(58) Field of Classification Search
CPC .......... A61G 3/0209; B60P 3/07; B60P 3/122; Y10S 224/924; B60R 9/10; B60R 9/06
USPC ........ 414/462, 537, 482, 483; 224/504, 506, 224/509, 524
See application file for complete search history.

(56) References Cited

U.S. PATENT DOCUMENTS

| | | | |
|---|---|---|---|
| 3,058,636 A | 10/1962 | Bilbeisi | |
| 3,348,713 A | 10/1967 | Will | |
| 3,724,694 A * | 4/1973 | Wilson | B60R 9/06 224/520 |
| 3,757,972 A | 9/1973 | Martin | |
| 4,032,167 A | 6/1977 | Chereda | |
| 4,234,284 A | 11/1980 | Hauff | |
| 4,275,981 A | 6/1981 | Bruhn | |
| 4,705,448 A * | 11/1987 | Mungons | B60R 9/10 224/509 |
| 4,813,841 A | 3/1989 | Eischen | |
| 4,934,894 A | 6/1990 | White | |
| 4,971,509 A * | 11/1990 | Sechovec | A61G 3/0209 224/507 |
| 5,016,896 A | 5/1991 | Shafer | |
| 5,018,651 A * | 5/1991 | Hull | B60R 9/06 224/280 |
| 5,449,100 A | 9/1995 | Eckhart | |
| 5,494,393 A | 2/1996 | Schrunk | |
| 5,676,292 A * | 10/1997 | Miller | B60R 9/06 224/282 |
| 5,857,824 A | 1/1999 | De Aquiar | |
| 5,884,930 A | 3/1999 | Cluth | |
| 5,938,395 A * | 8/1999 | Dumont, Jr. | B60R 9/06 224/497 |
| 5,996,869 A | 12/1999 | Belinky et al. | |
| 6,129,371 A | 10/2000 | Powell | |

(Continued)

*Primary Examiner* — Gregory Adams
(74) *Attorney, Agent, or Firm* — Andrus Intellectual Property Law, LLP

(57) ABSTRACT

A tiltable hauling device includes a frame assembly that supports a ramp. The frame assembly includes a pivot bracket with a first pivot guide and a second pivot guide. The ramp includes a first hinge pin and a second hinge pin. A tilt assembly includes a pivot guide that is configured to selectively engage the first hinge pin and the second hinge pin to optionally restrain and permit movement of the first hinge pin and the second hinge pin within the respective first pivot guide and the second pivot guide to enable tilting of the rack in two directions respectively about the first hinge pin and the second hinge pin.

20 Claims, 7 Drawing Sheets

(56) References Cited

U.S. PATENT DOCUMENTS

| | | | |
|---|---|---|---|
| 6,139,247 A | 10/2000 | Wright | |
| 6,345,749 B1 | 2/2002 | Hamilton | |
| 6,685,421 B1 | 2/2004 | Reeves | |
| 6,722,380 B1 | 4/2004 | Hafer | |
| 6,783,315 B1 | 8/2004 | Senechal | |
| 7,527,282 B2 * | 5/2009 | Gilbert | B60R 9/10 224/504 |
| 7,600,774 B1 | 10/2009 | Speer et al. | |
| 7,811,045 B2 * | 10/2010 | Butta | B60R 9/06 224/509 |
| 7,841,821 B2 | 11/2010 | Miro et al. | |
| 9,033,641 B1 * | 5/2015 | Barefoot | B60P 3/06 414/462 |
| 2001/0031193 A1 | 10/2001 | Chevrier | |
| 2008/0206031 A1 | 8/2008 | Butta | |
| 2010/0163590 A1 | 7/2010 | McCaughan | |

\* cited by examiner

TILTABLE HAULING DEVICE

BACKGROUND

The present disclosure is related to the field of automotive accessories for carrying and transporting cargo. More particularly, the present disclosure relates to devices that can be removably mounted to automotive vehicles for the transport of auxiliary vehicles or cargo.

There are a wide variety of transportation devices available for use by people for recreation, transportation, or mobility. Such auxiliary transportation vehicles include, but are not limited to motorcycles, all-terrain vehicles (ATV), motorized wheelchairs, mobility scooters, mobility carriers, lawn mowers, lawn tractors, go karts, and the like. Often, these devices are designed to provide a specific transportation need within a localized area. Therefore, these devices must be transported, exemplary by automobile (e.g. car or truck) to the area in which the transportation device will be used. While some of these devices are small enough to fit within a truck, backseat, van interior, or truck bed, many of these are not.

Additionally, since these transport devices are typically wheeled vehicles and often heavy (e.g. up to 700 pounds) such devices are difficult to lift onto any elevated surface for transportation.

Various vehicle-mounted carrying racks have been devised to transport such transportation devices and other cargo. Some examples are disclosed in U.S. Pat. No. 7,841,821 entitled Tiltable Hauling Device, which is presently assigned to the Applicant. However, it has been recognized by the Applicant that further solutions are desired in this field to facilitate loading and unloading of the carrier rack as well as storage of the carrier rack when not in use.

BRIEF DISCLOSURE

An exemplary embodiment of a tiltable hauling device includes a frame assembly configured to be connected to a vehicle. The frame assembly includes a pivot bracket with a first pivot guide and a second pivot guide. The rack is moveably mounted to the frame assembly. The rack includes a deck. The rack includes a first hinge pin moveably received within the first pivot guide and a second hinge pin moveably received in within the second pivot guide. A tilt assembly includes a pivot bar that is configured to selectively engage the first hinge pin and the second hinge pin. A first position of the pivot bar restrains the first hinge pin from movement within the first pivot guide and permits the second hinge pin to move within the second pivot guide to tilt the rack about a first axis located at the first hinge pin. A second position of the pivot bar restrains the second hinge pin from movement within the second pivot guide and permits the first hinge pin to move within the first pivot guide to tilt the rack along a second axis located at the second hinge pin.

An exemplary embodiment of a vehicular mounted tiltable hauling device includes a frame assembly. The frame assembly includes a frame tube and a first pivot bracket. The first pivot bracket includes a first pivot guide and a second pivot guide. A shank is connected to the frame assembly. The shank is configured to be secured to a vehicle hitch receiver. The rack includes a deck supported between a first rail and a second rail. The rack is moveably secured to the frame assembly. The rack includes a first hinge pin and a second hinge pin extending outward from the first rail. The ramp is moveably disposed within the rack between the deck and the first and second rails. A tilt assembly includes a pivot bar that is configured to selectively engage the first hinge pin and the second hinge pin. The pivot bar is moveable between at least three positions. The first position of the pivot bar restrains the first hinge pin from movement within the first pivot guide and permits the second hinge pin to move within the second pivot guide to tilt the rack about a first axis located at the first hinge pin. A second position of the pivot bar restrains the second hinge pin from movement within the second pivot guide and permits the first hinge pin to move within the first pivot guide to tilt the rack about a second axis located at the second hinge pin. A locked position of the pivot bar restrains both the first hinge pin and the second hinge pin from movement within the first pivot guide and the second pivot guide.

Another exemplary embodiment of a vehicular mounted tiltable hauling device includes a frame assembly. The frame assembly includes a frame tube, a first pivot bracket, and a second pivot bracket. The first and second pivot bracket each comprise first and second pivot guides. A folding hitch adaptor includes a shank configured to connect to a vehicle. The frame assembly is secured to the folding hitch adaptor and pivotable about the folding hitch adaptor between a first position and a second position. A rack includes a deck supported between opposed rails. The rack is moveably secured to the frame assembly. The rack further includes a first hinge pin and a second hinge pin extending outward from each of the opposed side rails. The first and second hinge pins from each of the opposed side rails are moveably received within the first and second pivot guides of the respective first pivot bracket and second pivot bracket. A ramp is moveably disposed within the rack between the deck and a ramp lip extending inward from each of the opposed rails. Rack doors are secured between the opposed rails at each of the ends of the opposed rails. The rack doors close to retain the ramp within the rack and open to permit the ramp to be at least partially removed from within the rack. A tilt assembly connected to the first pivot bracket includes a handle connected to a pivot bar and moveably connected to the first pivot bracket. Movement of the handle translates the pivot bar between at least three positions. A first position of the pivot bar restrains the first hinge pin from movement within the first pivot guide and permits the second hinge pin to move within the second pivot guide to tilt the rack about a first axis located at the first hinge pin. A second position of the pivot bar restrains the second hinge pin from movement within the second pivot guide and permits the first hinge pin to move within the first pivot guide to tilt the rack about a second axis located at the second hinge pin. A locked position restrains both the first hinge pin and the second hinge pin respectively within the first pivot guide and the second pivot guide.

DETAILED DISCLOSURE

Figure 1:
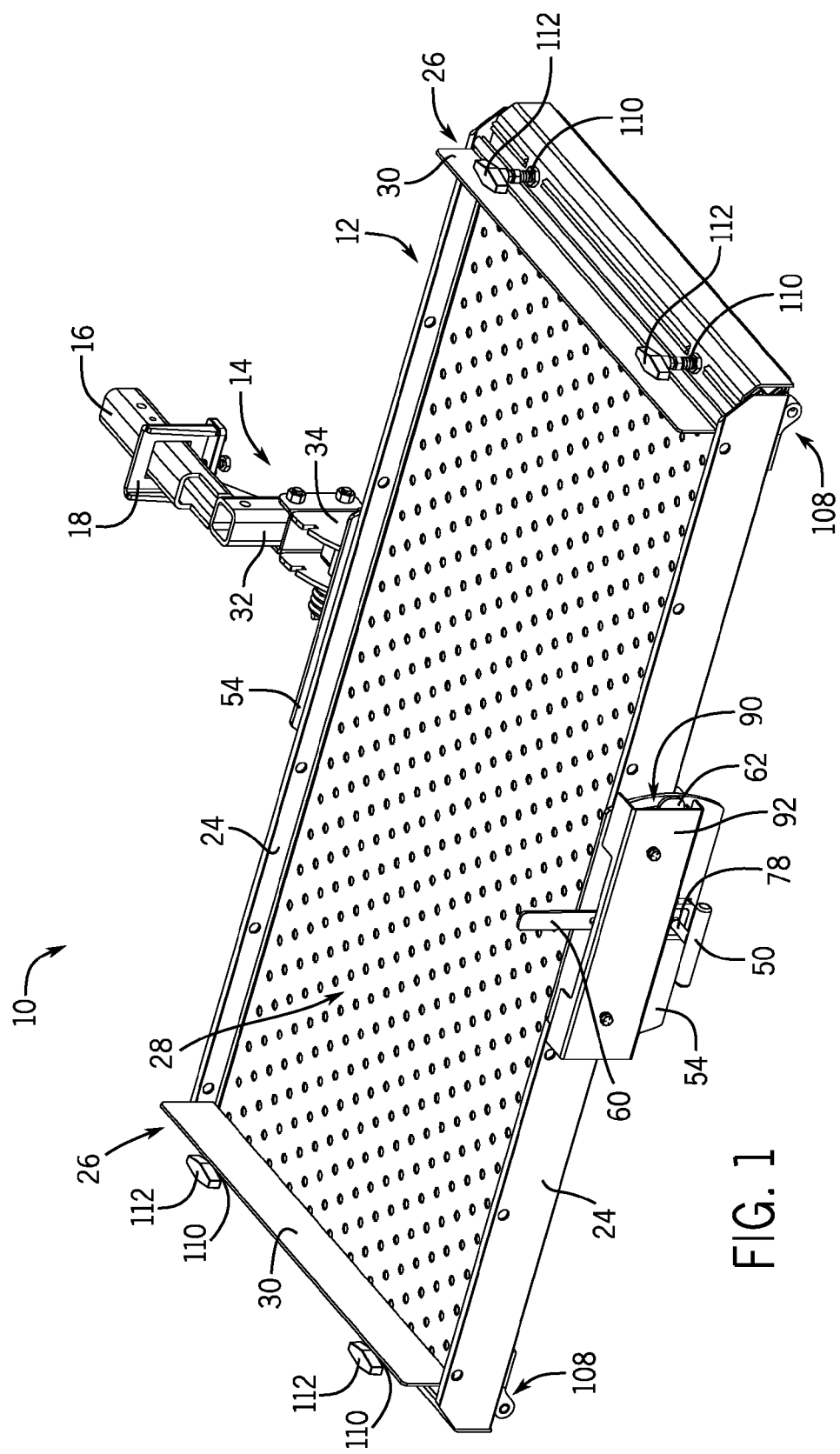
FIG. 1 is a perspective view of an exemplary embodiment of a tiltable hauling device.

FIG. 1 depicts an exemplary embodiment of a tiltable hauling device 10. The tiltable hauling device 10 is a rack 12 and a folding hitch adaptor 14. The folding hitch adaptor 14 includes a hitch shank 16 and an anti-tilt bracket 18 which facilitates a connection of the folding hitch adaptor 14 to a hitch receiver 20 mounted to a vehicle 22 (FIG. 2).

The rack 12 is generally elongated in a horizontal dimension and bounded by a pair of opposed rails 24 and two generally opposed folding end doors 26. The folding end doors 26 are moveably secured between the opposed rails 24 at either end thereof. The deck 28 is generally planar and extends between the rails 24 and is bounded by the other sides by the folding end doors 26. The deck 28 may be exemplarily constructed of sheet metal, expanded metal mesh, or other known deck material. The rails 24 further exemplarily include a plurality of holes 25 to facilitate tying or otherwise restraining the transportation device or other cargo to the rack 12 during transport. Embodiments of the folding end doors 26 are exemplarily moveable between open and closed positions and when in a closed position, exemplary extend over an end portion of the deck 28. The folding end door 26 exemplary includes a tire stop 30, which when the folding end door 26 is in the closed position, extends away from the deck 28.

Figure 2:
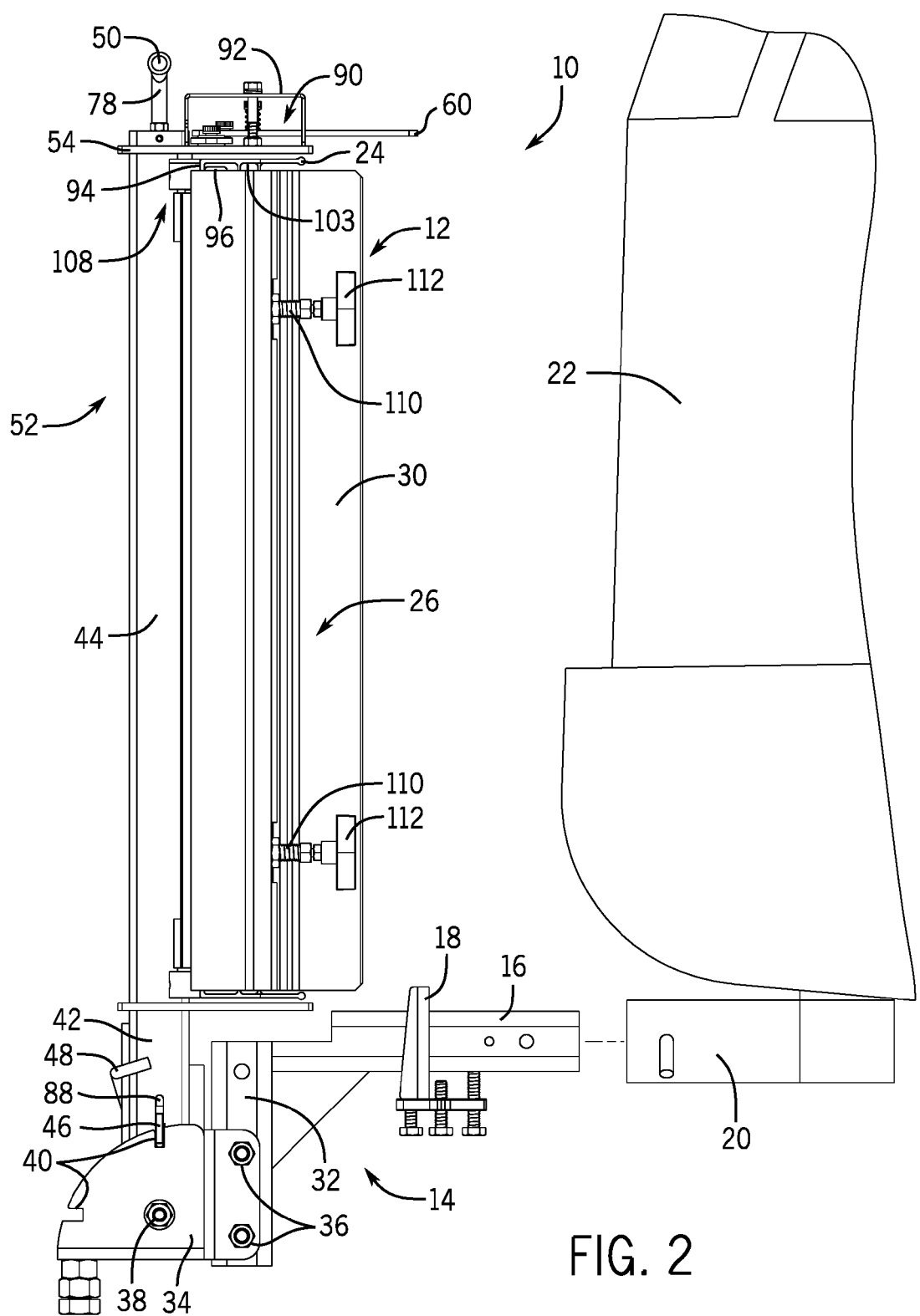
FIG. 2 is a side view of a tiltable hauling device in an up position.
Figure 3:
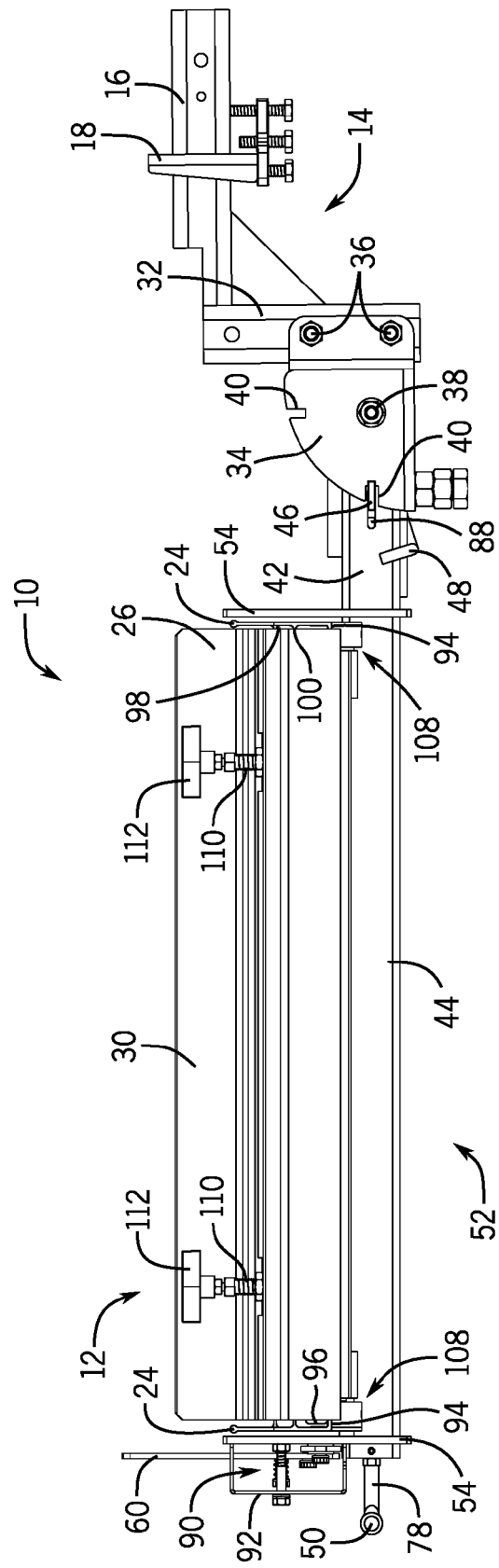
FIG. 3 is a side view of an exemplary embodiment of the tiltable hauling device in a down position.

FIGS. 2 and 3 exemplary depict the tiltable hauling device 10 folded about the folding hitch adaptor 14 between an up position (FIG. 2) and a down position (FIG. 3). As depicted in FIG. 2, the up position exemplary positions the rack 12 of the tiltable hauling device 10 folded about the folding hitch adaptor 14 to orient the rack 12 in a generally vertical orientation and close to a rear of a vehicle 22 to minimize the distance that the tiltable hauling device 10 extends away from the end of the vehicle 22, exemplary when the rack 12 is not in use and to facilitate storage of the tiltable hauling device 10 and/or the vehicle 22 to which it is secured. FIG. 3 depicts the tiltable hauling device 10 in the down position as it would appear when in use to carry a transportation device or other cargo.

The folding hitch adaptor 14 further includes a hitch tube 32 which is exemplary perpendicular to the hitch shank 16. An angle adaptor 34 may be adjustably mounted to the hitch tube 32. Exemplary, the angle adaptor 34 is secured with bolts 36 to the hitch tube 32, exemplary through one or more of a plurality of holes in the hitch tube 32.

A pivot bolt 38 extends through the angle adaptor 34 as well as a connection shank 42 of a frame tube 44 of the rack 12. They pivotally connect the connection shank 42, and therefore the rack 12 to the angle adaptor 34. The rack 12 is able to pivot between the up position (FIG. 2) and the down position (FIG. 3) about the pivot bolt 38. As will be described in further detail herein, a shank plate 46 extends exterior the connection shank 42 of the frame tube 44. The shank plate 46 is mechanically connected to a handle 50. The shank plate 46 engages notches 40 in the angle adaptor 34. The notches 40 define various positions or angles of the rack 12 relative to the angle adaptor 34. While the embodiment depicted shows two such positions namely the up position and the down position of the rack 12 it will be understood that other positions, including, but not limited to positions between the two notches 40 depicted may be present in other embodiments. A spring 48, is exemplary a coil spring which engages the angle adaptor 34 and the connection shank 42 to bias the rack 12 in the up position.

In use, a user pulls on the handle 50 to disengage the shank plate 46 from the notch 40 to allow rotation of the rack 12 about the pivot bolt 38. The spring 48 provides an upward bias force against the connection shank 42 and the rack 12. This exemplary counteracts the weight of the rack 12 and facilitates user movement of the rack 12 by helping to lift the rack 12 when moved into the up position and by reducing an apparent weight of the rack 12 to the user when lowering the rack 12 to the down position. This enables the user to move the rack 12 with less work and under more control. It will be recognized that other embodiments may use other arrangements of folding hitch adaptors. Non-limiting examples of other folding hitch adaptors which may be used are disclosed in Applicant's co-pending U.S. patent application Ser. No. 14/993,758, filed Jan. 12, 2016 and entitled "Folding Hitch Adaptor", which is hereby incorporated by reference herein in its entirety.

Figure 4:
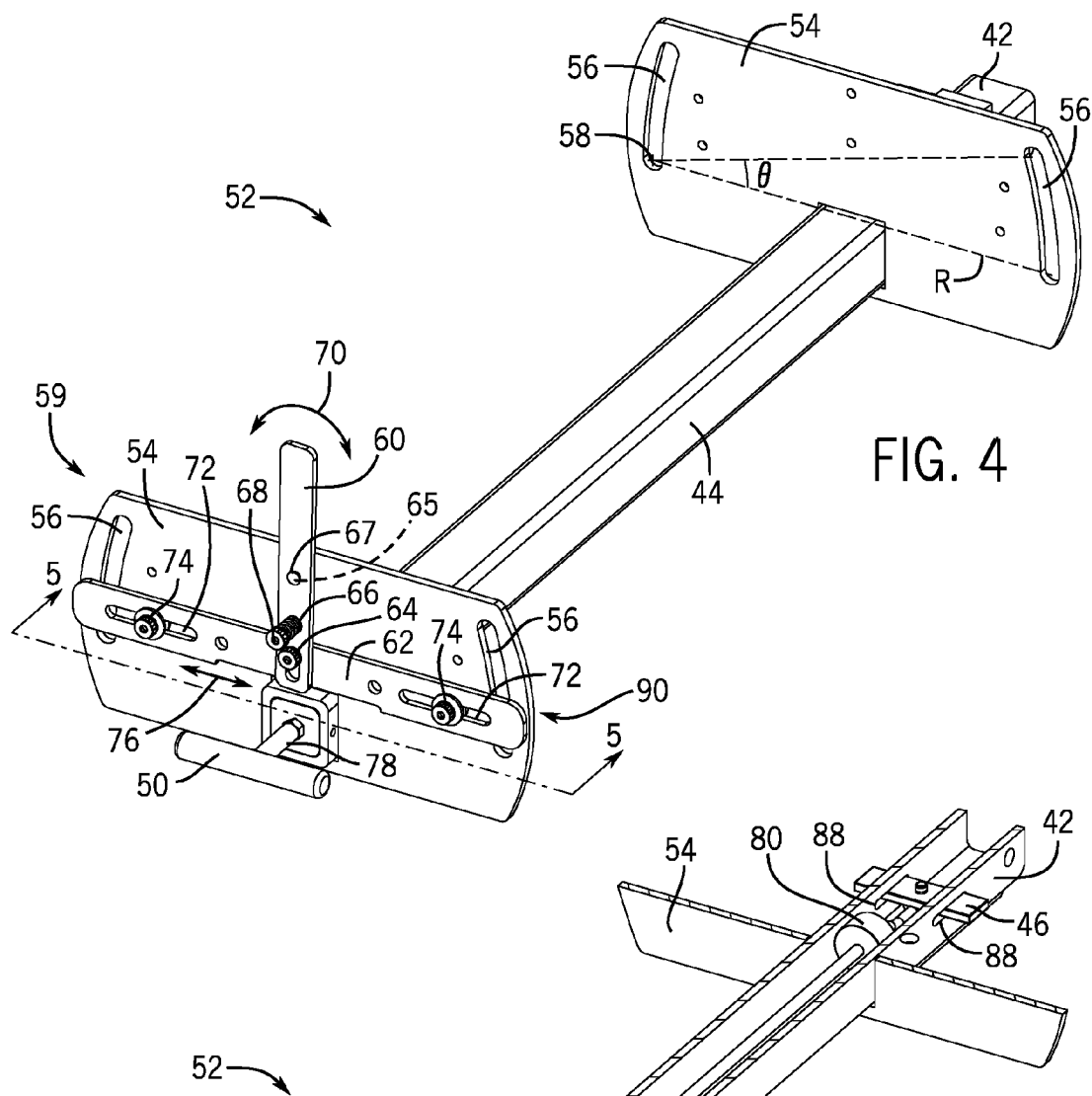
FIG. 4 is a perspective view of a frame assembly.

FIG. 4 is a perspective view of an exemplary embodiment of a frame assembly 52 of the tiltable hauling device 10. The frame assembly 52 includes the frame tube 44 with a connection shank 42 at one end. The frame assembly 52 further includes two pivot brackets 54, generally disposed at opposed ends of the frame tube 44, although the connection shank 42 extends beyond one of the pivot brackets 54. The pivot brackets 54 include two pivot guides 56 which will be explained in further detail herein. An exemplary embodiment, the pivot guides 56 are formed in the pivot brackets 54 as elongated blind holes (not depicted) or elongated through holes (depicted). The pivot guides 56 may be the shape of an arc with a radius R as measured from a center point 58 of an axis defined in the opposing pivot guide 56, as will be explained further herein. Each of the pivot guides 56 exemplary extend through an angle θ.

At the front end 59 of the frame assembly 52 a handle 60 is movably mounted to the pivot bracket 54. The handle 60 is movably connected to a pivot bar 62 by a joint bolt 64. A bias spring 66 is secured against the handle 60 by a bias bolt 68 which also pivotally connects the handle 60 to the pivot bracket 54. The handle 60 is rotatably movable about the bias bolt 68 and the bias spring 66 places a biasing force against the handle 60 toward the pivot bracket 54.

In an embodiment, the pivot bracket 54 includes a projection 65 that sticks outward from the pivot bracket 54. The pivot handle 60 includes a hole 67 which is configured to engage with and receive the projection 65, thereby restraining the handle 60 against occasional movement. It will be recognized that in an alternative embodiment, the projection 65 may be located on the handle 60 and the hole 67 located on the pivot bracket 54. It will also be recognized that other mechanically interlocking or engaging features may be also used. The bias force produced by the bias spring 66 against the handle 60 helps to resiliently keep the projection 65 engaged with the hole 67. However, a user can overcome this bias by pulling the handle 60 outward against the bias spring, to overcome the bias force produced by the spring so as to disengage the hole 67 from the projection 65. With such movement, the handle 60 can be moved in the direction of arrow 70. The pivot bar 62 includes bar guides 72, which exemplary be horizontally oriented cutouts through which bar fasteners 74 are located. The bar fasteners 74 movably secures the pivot bar 62 to the pivot bracket 54 and define a range of translative movement of the pivot bar 62 in the direction of arrow 76. In use, as the handle 60 is rotated in either direction along arrow 70, such rotative movement about the bias bolt 68 mechanically results in translation of the pivot bar 62 in one of the directions of arrow 76. As will be explained in further detail herein, this arrangement facilitates a user to select between lock and open arrangements of the tiltable hauling device 10

Figure 5:
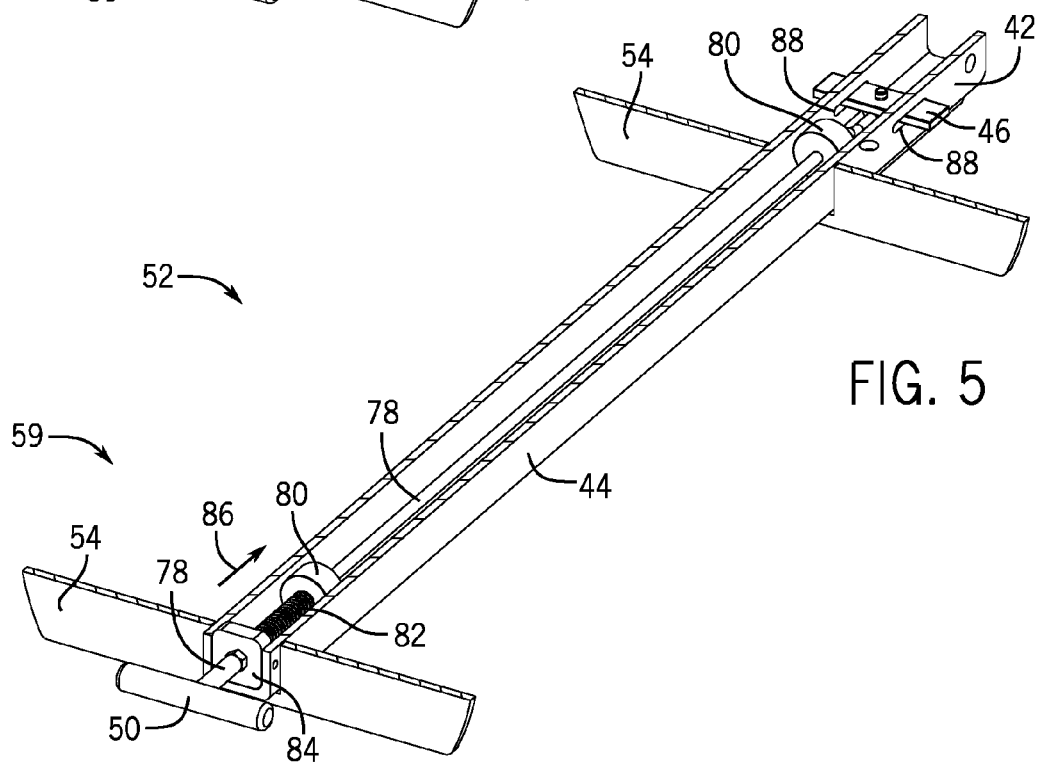
FIG. 5 is a cut away view of an exemplary embodiment of a frame assembly taken along line 5-5 of FIG. 4.

FIG. 5 is a sectional view of the frame assembly 52 as taken along line 5-5 of FIG. 4. With the frame tube 44 opened in the sectional view, the lock rod 78 disposed therein can be seen. The lock rod 78 extends from one end connected to the handle 50 to an opposing end secured to the shank plate 46. At least one shaft collar 80 is secured to the lock rod 78. A rod spring 82 places a biasing force on the lock rod 78, exemplary in the direction of arrow 86.

In an exemplary environment, the lock rod is configured to translate within the frame tube 44 and the rod spring 82 is secured between the shaft collar 80 and the end cap 84 of the frame tube 44. The force of the rod spring 82 between the shaft collar 80 and the end cap 84 biases the lock rod 78 in the direction toward the connection shank 42 and biases the shank plate 46 into a shank end of a shank plate guide 88 through the connection shank 42 and within which the shank plate 46 travels. Referring back to FIGS. 2 and 3, the biasing of the shank plate 46 in this position helps to resiliently lock the shank plate 46 within notches 40 of the angle adaptor 34. Thus, in operation, a user pulls the handle 50 outward which overcomes the bias of the rod spring 82 and translates the lock rod 78 within the frame tube 44 and moves the shank plate 46 to the other end of the shank plate guide 88 thereby moving the shank plate 46 out of the notches 40 and releasing the rack 12 for pivotable movement relative to the angle adaptor 34.

Figure 6:
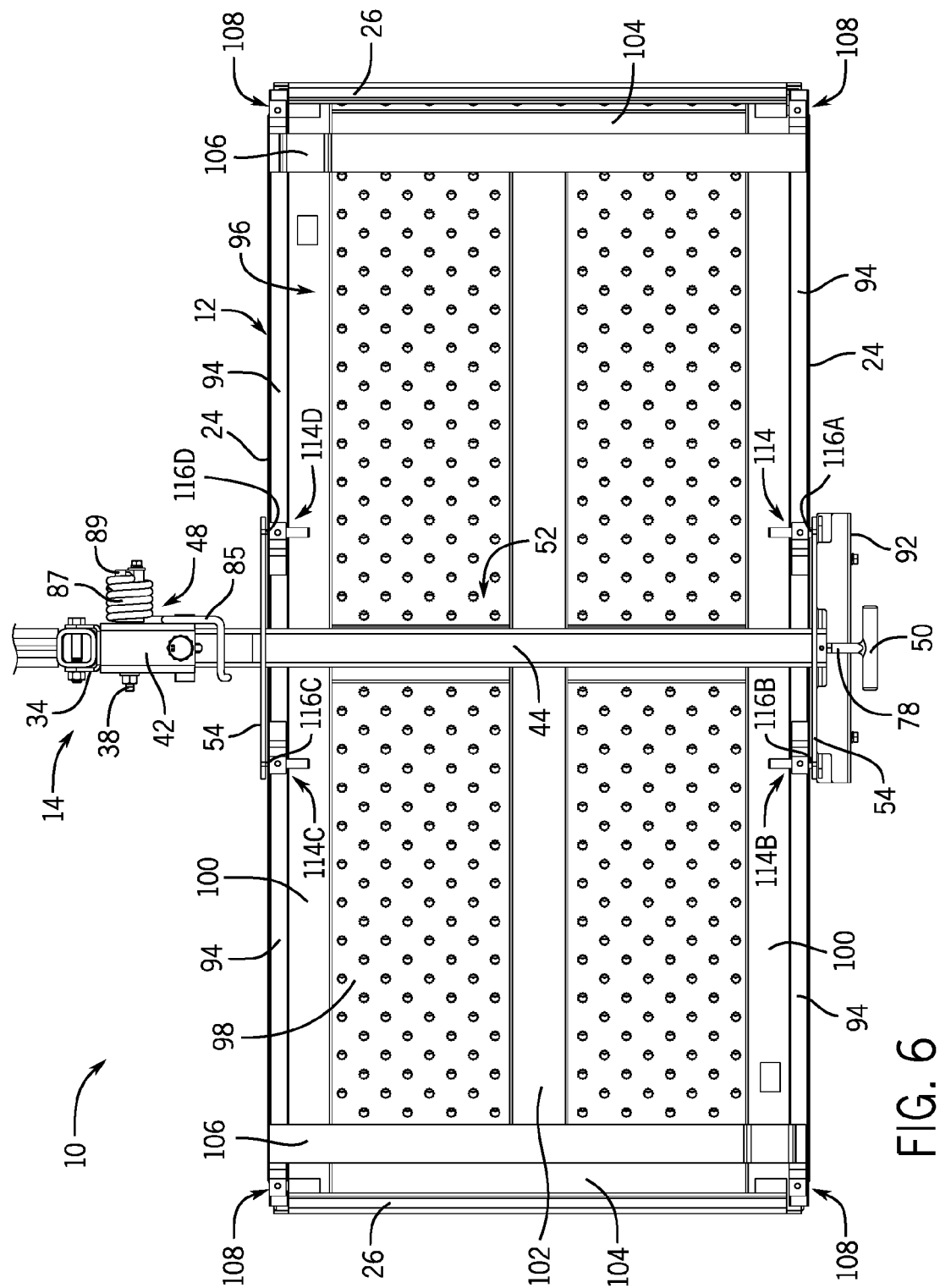
FIG. 6 is a bottom view of an exemplary embodiment of a tiltable hauling device.
Figure 7:
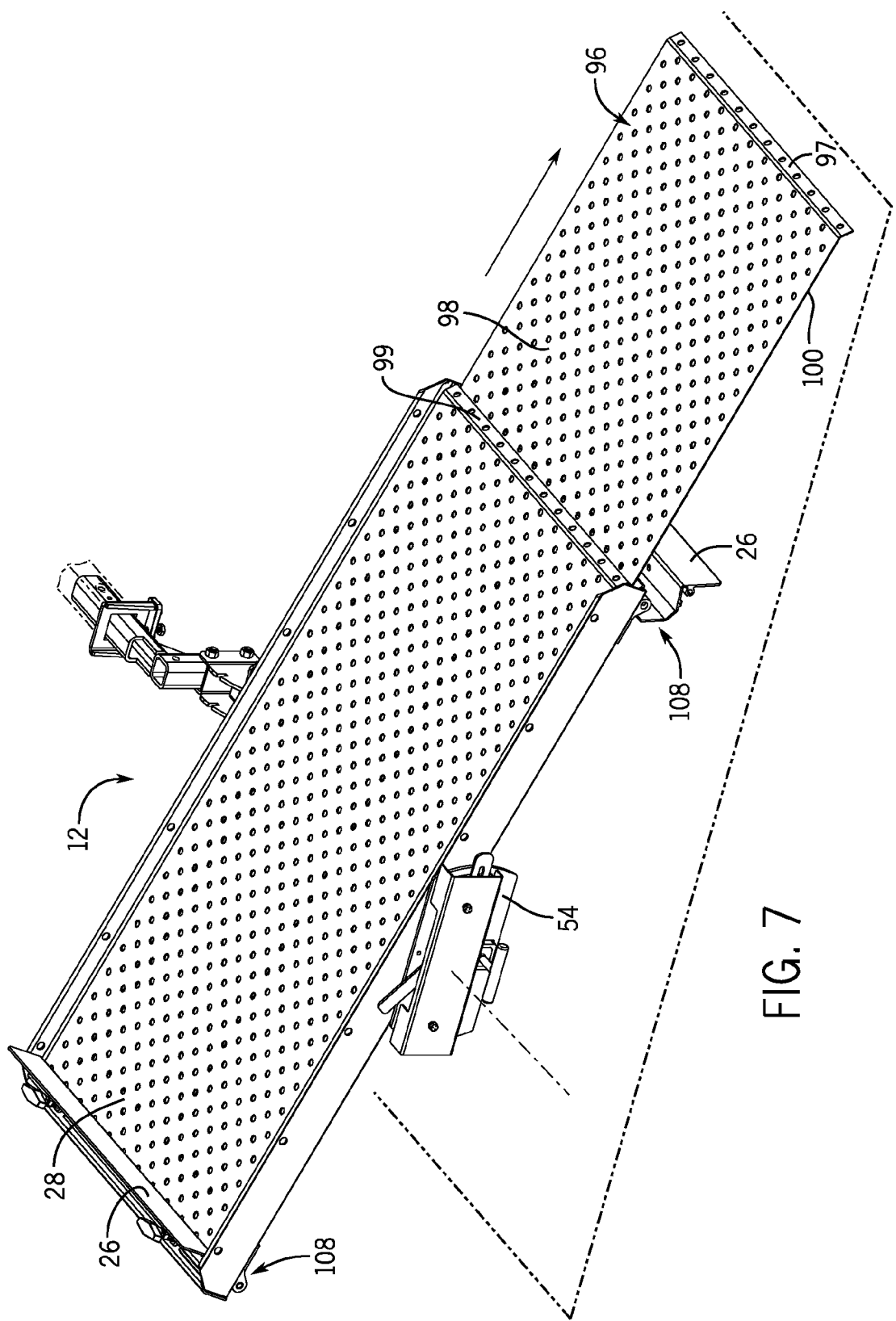
FIG. 7 is a perspective view of an exemplary embodiment of a tiltable hauling device with a ramp partially extended.

FIG. 6 is a bottom view of the tiltable hauling device 10. The bottom view shows the frame assembly 52 with the frame tube 44 and opposed pivot brackets 54. The frame assembly 52 pivotably supports the rack 12 which is defined by the rails 24. The rails 24 include a ramp lip 94 which supports a ramp 96 as discussed in further detail herein. As best seen in FIG. 7, ramp 96 is slideably held within the rack 12, and more specifically between the ramp lip 94 and the deck 28. The side rails 24 are connected by cross plates 102 that extend between the ramp lips 94 of the rails 24. The folding end doors 26 are pivotably connected between the rails 24 exemplary with hinges 104 between the rails 24 and the folding end doors 26.

The ramp 96 is exemplary constructed of a platform 98 which is exemplary made of sheet metal or stamped sheet metal but in other embodiments may be a wire or an expanded metal mesh. The platform 98 is secured over side supports 100 and center supports 102 as well as end supports 104. The side supports 100, center support 12, and end supports 104 may be exemplarily constructed of box tubing and in a further exemplary embodiment, box tubing with a rectangular cross-section. The ramp 96 may have a ramp lip 97 exemplarily as a portion of the platform 98 that extends beyond the end supports 104. The ramp lip 97 can for a transition from the ground to the rest of the ramp, when the ramp lip 97 engages the ground to receiver a transportation device or other cargo. As mentioned above, the ramp 96 is slidably received between the deck 28 and the ramp lips 94. While not depicted in FIG. 7, it is contemplated that in embodiments, the single ramp 96 may instead be two or more ramps 96. In such embodiments, the two or more ramps would be slidably received within the rack 12.

In an exemplary embodiment, the deck 28 may be constructed in a similar manner as ramp 96 but the side supports 103 of the deck 28 may be secured to the rails for an integral part with the rails 24 (FIGS. 2 and 3). The deck 28 further includes a deck lip 99, that similar to the ramp lip 97, facilitates the transition from the ramp 96 to the deck 28. The deck lip 99 exemplarily extends at a downward angle past an end support (not depicted) of the deck 28 to facilitate movement of the transportation device or other cargo from the ramp 96 on to the deck 28.

The folding end doors 26 are exemplary held in the locked position by at least one pin 110. These are exemplary depicted in FIGS. 1 and 3. The pin 110 is exemplary a spring biased pin that may be lifted upward using a handle 112 to release the pin 110 from engagement through the folding end door 26 and exemplary into the deck 28. In still further embodiments, the pin 110 may include one or more locking nuts, operable to be tightened to lock the pin 110 in a position securing the folding end door 26 in the closed position.

The rack 12 is generally supported by the frame assembly 52. The frame assembly 52 supports the rack 12 in the manner as disclosed herein, both to tilt the tack 12 generally about the frame assembly 52, by to support the wright of the transportation device or other cargo loaded into the deck 28 and transfer this weight to the hitch receiver of the vehicle.

The folding hitch adaptor 14 is exemplarily biased in the up position by a spring 48. The spring includes a spring arm 85 that engages the connection shank 42 of the frame assembly 52. The spring 48 further includes a coil section 87 secured to a cleat 89. The coil section 87 and the cleat 89 are exemplarily in coaxial alignment with the pivot bolt 38 and creates the bias force applied to the connection shank 42 by the spring arm 85. In embodiments, the pivot bolt may be exemplarily permanently secured through the angle adaptor 34 for example by welding and therefore serves as a permanent pivot point for the frame assembly.

As will be described in further detail herein, in embodiment, the rack 12 is supported by the frame bar 44, exemplarily by the rails 26 resting on the frame bar 44, when the rack 12 is in a position for carrying or transporting the transportation device or other cargo. When the rack is tilted to other side to facilitate loading or unloading of the transportation device or other cargo from the rack 12, the rack 12 is supported by the engagement of one or more hinge pins within one or more pivot guides 56 in a pivot bracket 54. The rack 12 pivots about an axis formed along one or more hinge pins 116, while at least one additional hinge pin 116 move within a pivot guide 56.

Figure 8A:
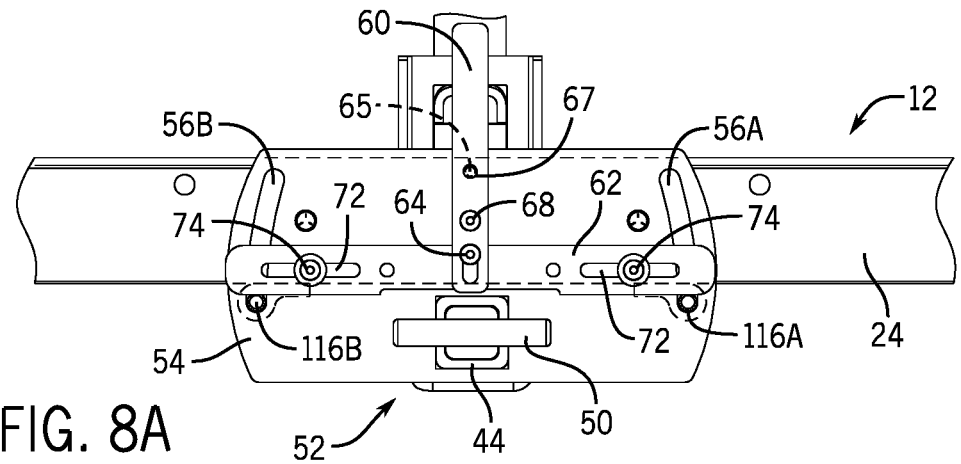
FIG. 8A is a close up front view of an exemplary embodiment of a frame assembly of a tiltable hauling device in a locked position.
Figure 8B:
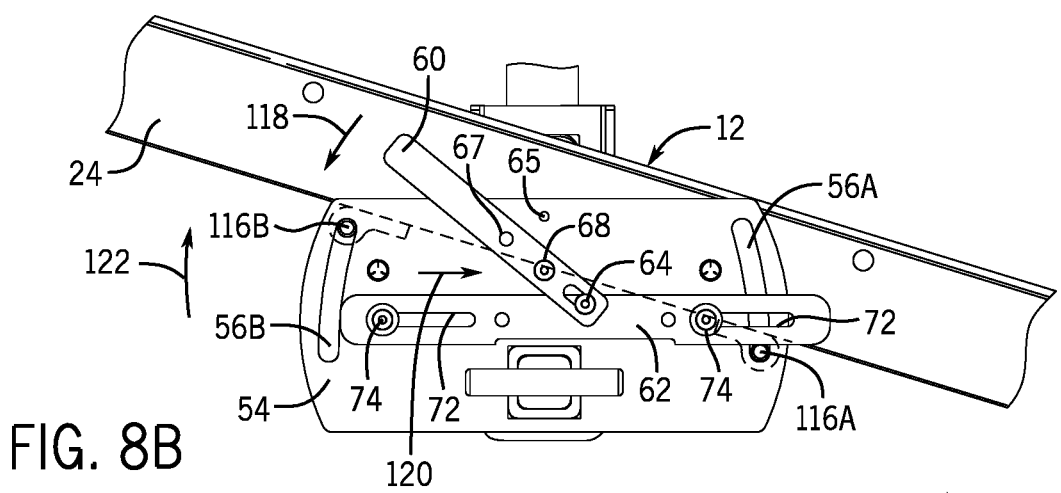
FIG. 8B is a close up front view of an exemplary embodiment of the frame assembly of the tiltable hauling device in a tilting position to one side.
Figure 8C:
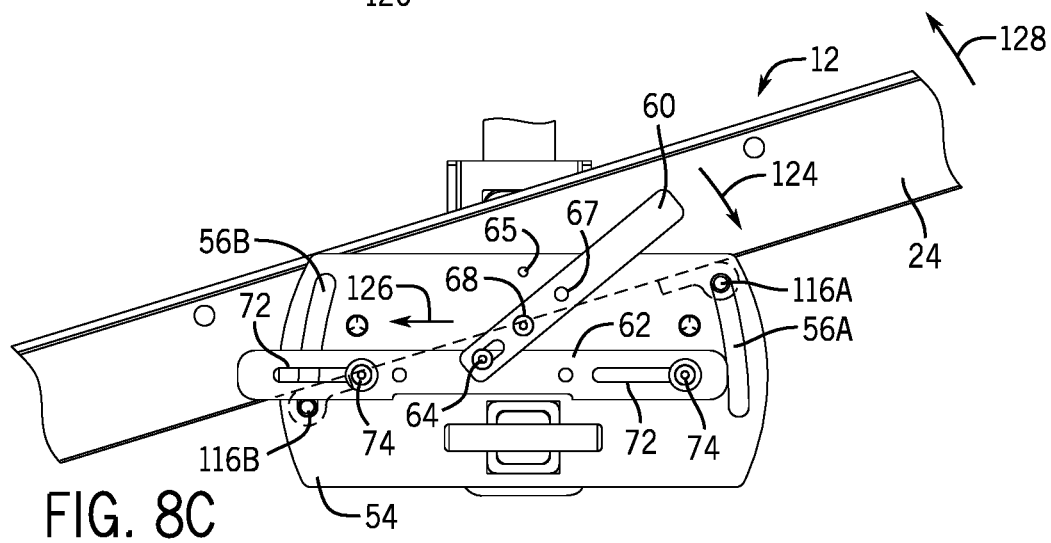
FIG. 8C is a close up front view of an exemplary embodiment of the frame assembly of the tiltable hauling device in a tilting position to another side.

FIGS. 8A-8C are a close up views of the frame assembly 52 and a portion of the rack 12 with the tilt assembly cover 92 removed and operated into various positions. FIG. 8A depicts the frame assembly 52 and the rack 12 in a neutral or locked position in which the rails 24 of the rack 12 are exemplary resting on the frame tube 44 of the frame assembly 52. As best seen in FIG. 6, the ramp 12 includes four hinges 114A-D with hinge pins 116A-D. The hinge pins 116 extend through their respective hinge 114A-D and into one of the pivot guides 56 of the frame assembly 52. In one embodiment, the hinge pins may extend through the pivot guides 56. As depicted in 8A, the hinge pin 116A and 116B are visible extending through the respective guides 56A and 56B. In the locked position, the pivot bar 62 engages and/or restrains the hinge pins 116A and 116B from moving within their respective pivot guides 56A and 56B. As previously explained, the handle 60 is biased into engagement between a projection 65 and a hole 67 of the handle 60. This engagement locks the handle 60 in an upright position and maintains the pivot bar 62 in the locked position restraining the hinge pins 116A and 116B. While not seen in FIG. 8A, it will be recognized that embodiments may include two pivot brackets 54 (FIGS. 1-6). In such embodiments, hinge pins 116C and 116D (FIG. 6) extending from the other rail 26 exemplarily engage the pivot guides (not depicted) of the other pivot bracket 54.

In FIG. 8B, the biasing force against the handle 60 has been overcome and the hole 67 of the handle 60 disengaged from the projection 65 of the pivot bracket 54. The handle 60 has been moved in the direction of arrow 118. This pivoted the handle 60 about the bias bolt 68 and moved the joint bolt 64 in the direction of arrow 120. The joint bolt 64 transferred this motion to the pivot bar 62 and the pivot bar 62 also translated in the direction of arrow 120 to the position depicted in FIG. 8B. In this position the pivot bar 62 still engages the hinge pin 116B, blocking the hinge pin 116B from movement within the pivot guide 56B. However, the opposite end of the pivot bar 62 has been moved away from the hinge pin 116A and the hinge pin 116A is free to travel within the pivot guide 56A. The pivot guide 56A exemplary be arc-like in shape for example to represent angle θ from a radius defined at the center point of the hinge pin of 116B. This center point of the hinge pin 116B represents an axis about which the rack 12 is tiltable in a first direction, exemplarily to the right as depicted in FIG. 8B. In embodiments, this axis is further represented and defined by hinge 114C and hinge pin 116C (FIG. 6), the hinge pin 116C of which would be held (and moveably) within a pivot guide of the associated pivot bracket 54. With the freedom of the hinge pin 116A to move within the pivot guide 56A, the entire rack 12 may be tilted about this axis defined by the captured hinge pin 116B in the direction of arrow 122 to the position depicted in FIG. 8B. In such a position with the rack 12 tilted, the ramp 96 can extend out of the rack 12 to engage the ground to facilitate loading and unloading of the tiltable hauling device. This is exemplary depicted in FIG. 7. The pivot guide 56A thus defines a maximum tilt for the rack 12.

FIG. 8C depicts operation of tilt the rack 12 to tile the rack 12 to the other side. Exemplary, the rack 12 was first returned to a neutral position with the rails 26 supported by the frame tube 44. The handle 60 is rotated in the direction of arrow 124. This rotation of the handle 60 in the direction of arrow 124 translates the pivot bar 62 in the direction of arrow 126 through the locked position of FIG. 8A to the position depicted in FIG. 8C. Translation of the pivot bar 62 in the direction of arrow 126 first engages and restrains the hinge pin 116A within the pivot guide 56A (e.g. in the locked position) and then maintains this restrain. The same movement of the pivot bar 62 frees the hinge pin 116B for movement within the pivot guide 56B. With such freedom of movement, the rack 12 can be pivoted about the hinge pin 116A in the direction of arrow 128 to the position of the rack 12 as shown in FIG. 8C.

The pivot bar 62 blocks the hinge pin 116A from movement within the pivot guide 56A while the opposite end of the pivot bar 62 has been moved away from the hinge pin 116B, which is free to travel within the pivot guide 56B. The pivot guide 56B is exemplarily arc-shaped, for example an arc with a radius R defined from a center point of the restrained hinge pin 116A. The pivot guide 56B exemplarily has an arc through an angle θ, which exemplarily coincides with an angle of tilt available for the rack 12. The center point of the hinge pin 116A exemplarily represents an axis about which the rack 12 is tiltable in a second direction, exemplarily to the left as depicted in FIG. 8C. In embodiments, this axis is further represented and defined by hinge 114D and hinge pin 116D, the hinge pin 116D of which would be held (and moveable) within a pivot guide (not depicted) of the associated pivot bracket 54. With the freedom of the hinge pin 116B to move within the pivot guide 56B, the entire rack 12 may be tilted about the axis defined by the captured hinge pin 116A in the direction of arrow 124 to the position depicted in FIG. 8C. in such a position with the rack 12 tilted, the ramp 96 can extend out of the rack 12 to the side opposite that depicted in FIG. 7 to engage the ground on the other side of the tiltable hauling device 10 to facilitate loading or unloading a transportation device or other cargo to/from the rack 12.

A non-limiting example of use of the tiltable hauling device 10 may therefore be carried out in the manner as described herein. The tiltable hauling device 10 may be secured to a hitch receiver 20 of a vehicle 22 and stored in the up position. The tiltable hauling device is exemplarily held in this position by the engagement of the shank plate 46 with notches 40 of the angle adaptor 34. When the user wishes to use the tiltable hauling device 10 to carry a transportation device or other cargo, the user lifts the handle 50 thereby disengaging the shank plate 46 from the respective notches 40 of the angle adaptor 34. The spring 48 places an upward biasing force against the connection shank 42 which counteracts some of the load of the rack 12 due to gravity which facilitates user rotation of the rack 12 about the pivot bolt 38 from the up position to the down position with increased control and stability. Once the rack 12 is in the down position, the user releases the handle 50 and the shank plate 46 engages another set of notches 40 in the angle adaptor 34, locking the rack 12 in the down position.

The user then pulls the handle 60 in a direction outward or away from the rest of the tiltable hauling device 10 to disengage the hole 67 in the handle 60 from the projection 65 on the pivot bracket 54. Once the handle 60 is free to move, the user rotates the handle 60 in a selected direction about the bias bolt 68 such that rotation of the handle 60 translates the pivot bar 62 to a position that disengages the pivot bar 62 from one of the hinge pins 116A and 116B. With disengagement of one of the hinge pins 116A and 116B, the disengaged hinge pin 116A, 116B is free to move within a respective pivot guide 56A, 56B in the pivot bracket 54. The rack 12 is then tiltable about the other hinge pins 116A, 116B which is still engaged by the pivot bar 62 and restrained from movement within the respective pivot guide 56A, 56B. Thus, the rack 12 is pivotable about that hinge pin.

The user then exemplary releases at least one pin 110 which retains the folding end door 26 in the closed position. The ramp 96 is slideably received between the deck 28 and the rails 24. By opening one of the folding end doors 26, the ramp 96 is exposed and can be slideably partially removed from within the rack and can extend outward past the deck 28. The ramp 96 can be extended and the rack 12 pivoted about the restrained hinge pin until the ramp 96 engages the ground and an opposing end of the rack 12 is elevated. In this manner, the rack 12 is tilted and provides a ramp to facilitate loading of a transport device, exemplary a wheeled transport device such as a motorcycle, scooter, wheelchair, ATV, golf cart, or lawn mower, onto the rack 12. However, it will be recognized that this list is merely exemplary and not limiting on the types of transport devices that may be loaded on the rack 12 but would further may include, but not be limited to a snowmobile and/or personal watercraft. In still further embodiment, the rack 12 may be loaded with cargo, exemplary a large household appliance such as an oven or a refrigerator, for which the ramp 96 could facilitate loading of the rack.

As the user moves the transportation device or other cargo up the ramp 96 and on to the deck of the rack 12, the transportation device or other cargo will approach the pivot point of the rack 12 as represented by the hinge pins retained by the pivot bar 62. When the center of mass of the transportation device or other cargo and the rack 12 passes over the pivot point, the rack 12 will pivot back about the hinge pin and the movable hinge pin will translate back along the pivot guide as the rack 12 returns to the neutral position. The potential angle of the tilt of the rack can be defined by the pivot guides within which respective hinge pins travel.

The hinge pin 116 restrained in the pivot guide 56 by the pivot bar 62 defines the axis about which the rack 12 tilt. This axis is off set from the venter line of tiltable hauling device 10, and exemplarily offset from the frame tube 44 of the frame assembly 52. Because the tilt axis is off set, the tiltable hauling device 10 provides greater support for the rack 12 (once the rack is returned to the neutral position) on the opposite side from the axis from which the rack 12 was loaded. As the rack 12 is locked, the center of mass of the cargo eventually passes across the axis and the rack tilts back to the neutral position where the rails 26 are supported by the frame assembly (e.g. frame tube 44) and the hinge pins 116 against the pivot guide 56. Once the rack 12 is loaded, the handle 60 can be returned to the locked position and locked by engagement of the hole 67 with the projection 65. The ramp 96 is slideably returned to the interior of the rack 12 and the folding end door 26 closed and retained in the closed position with at least one pin 110. When the transportation device or other cargo is to be unloaded from the rack 12 the handle 60 is again moved from the neutral position to either of the tilting positions. In such a manner, the rack 12 may be tilted to either direction to facilitate unloading of the rack 12. This may be useful in the event that the vehicle is parked against a wall or along the street and it is advantageous to unload to one side over the other. In still further embodiment, the rack 12 may be operated to tilt in a direction opposite of which it was tilted to load the rack 12. Exemplarily in the event of transporting a transportation device, the transportation device may be rolled forward up the ramp and onto the tilted rack 12 from one side and unloaded by continuing to roll the transportation device forward and down the ramp and rack tilted to the other side. Previous devices have been disadvantageous in that a transportation device must be unloaded. Oftentimes, transportation devices may be more easily controlled when moved or driven forward rather than backwards.

It will be recognized that in various embodiments, the rack 12 may be constructed in various widths, for example to accommodate wheel bases of different sized transportation devices. As non-limiting examples the rack 12 may be 6" or 8" if the tiltable hauling device is to be used to carry a motorcycle, scooter, or dirt bike. In other embodiments, the rack may be between 24" and 38" if the tiltable hauling device is exemplarily to be used with a powered wheelchair or mobility scooter. In still further embodiments, the rack 12 may be wider, for example to accommodate an ATV or a golf cart. However, it will be recognized that other dimensions and/or uses are contemplated while remaining within the scope of the present disclosure.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A tiltable hauling device, comprising:
    a frame assembly comprising a pivot bracket with a first pivot guide and a second pivot guide;
    a rack movably mounted to the frame assembly, the rack comprising a deck, the rack comprising a first hinge pin movably received within the first pivot guide and a second hinge pin movably received within the second pivot guide;
    a tilt assembly comprising a pivot bar that is configured to selectively engage the first hinge pin and the second hinge pin, the pivot bar movable between a first position of the pivot bar that restrains the first hinge pin from movement within the first pivot guide and permits the second hinge pin to move within the second pivot guide to tilt the rack about a first axis located at the first hinge pin and a second position of the pivot bar that restrains the second hinge pin from movement within the second pivot guide and permits the first hinge pin to move within the first pivot guide to tilt the rack about a second axis located at the second hinge pin and a lock position that restrains both the first hinge pin and the second hinge pin from movement respectively within the first pivot guide and the second pivot guide.

2. The tiltable hauling device of claim 1 wherein the pivot bar is movable to a lock position that restrains both the first hinge pin and the second hinge pin from movement respectively within the first pivot guide and the second pivot guide.

3. The tiltable hauling device of claim 2, further comprising a handle movably secured to the pivot bar, wherein movement of the handle translates the pivot bar between the first position, second position, and the lock position.

4. The tiltable hauling device of claim 3, further comprising:
    a projection by which the handle engages the pivot bracket;
    a bias bolt that rotationally connects the handle to the pivot bracket; and
    a bias spring about the bias bolt that places a bias force against the handle to resiliently maintain engagement of the handle and the pivot bracket at the projection.

5. The tiltable hauling device of claim 1, further comprising:
    a handle movably secured to the pivot bar, wherein movement of the handle translates the pivot bar between the first position and the second position;
    a joint bolt that movably secures the handle to the pivot bar, such that rotation of the handle is mechanically transferred to translation of the pivot bar;
    first and second bar guides defined through the pivot bar; and
    first and second bar fasteners that extend through the respective first and second bar guides to movably secure the pivot bar to the pivot bracket.

6. The tiltable hauling device of claim 5, wherein engagement of the first and second bar fasteners with the ends of the first and second bar guides define the first and second positions of the pivot bar.

7. The tiltable hauling device of claim 1, wherein the pivot bar selectively engages a portion of the first hinge pin that extends through the first pivot guide past the pivot bracket and a portion of the second hinge pin that extends through the second pivot guide past the pivot bracket.

8. The tiltable hauling device of claim 1, further comprising:
   wherein the pivot bracket is a first pivot bracket;
   wherein the frame assembly comprises a second pivot bracket comprising a third pivot guide and a fourth pivot guide
   wherein the rack comprises a third hinge pin movably received within the third pivot guide and a fourth hinge pin movably received within the fourth pivot guide.

9. The tiltable hauling device of claim 1, further comprising:
   a folding hitch adaptor comprising an angle adaptor and a hitch shank configured to connected to a vehicle;
   wherein a connection shank of the frame assembly is pivotably secured to the angle adaptor, and the frame assembly is pivotable relative to the angle adaptor between at least a first position and a second position.

10. The tiltable hauling device of claim 9, further comprising:
    a lock rod disposed within the frame assembly and in which a first end of the lock rod extends outward from the pivot bracket;
    a shank plate secured to a second end of the lock rod, the second end of the lock rod opposite the first end, and the shank plate extends exterior from the connection shank; and
    a bias spring that engages the lock rod and biases the lock rod and the shank plate in a first position;
    wherein the angle adaptor comprises at least a first notch associated with the first position of the frame assembly and a second notch associated with the second position of the frame assembly, wherein when the lock rod and the shank plate are in the first position, the shank plate engages one of the first notch and the second notch, and when the lock rod and shank plate are in the second position, the frame assembly is movable between the first position and the second position.

11. The tiltable hauling device of claim 1, further comprising a ramp disposed within the rack.

12. The tiltable hauling device of claim 11, wherein the rack comprises a first rail and a second rail, the deck being secured between the first rail and the second rail, and the first and second hinge pins secured to the first rail.

13. The tiltable hauling device of claim 12, wherein the first rail and the second rail each further comprise a ramp lip extending from the respective first rail and second rail towards an interior of the rack, and the ramp is supported in the rack by the ramp lips in a position between the first and second rails and the deck.

14. The tiltable hauling device of claim 13, further comprising rack doors movably secured between the first and second rails at each end of the first and second rails, the rack doors being independently movable between a closed position that retain the ramp within the rack and an open position permitting the ramp to be at least partially removed from within the rack.

15. The tiltable hauling device of claim 14, further comprising a wheel stop extending upwards from each of the rack doors.

16. The tiltable hauling device of claim 1, wherein the first pivot guide defines an arc about the second axis with a radius from the second axis of a distance between the first axis and the second axis, and the second pivot guide defines an arc about the first axis with a radius of the distance between the first axis and the second axis.

17. A vehicular mounted tiltable hauling device, comprising:
    a frame assembly, the frame assembly comprising a frame tube and a first pivot bracket, the first pivot bracket comprising a first pivot guide and a second pivot guide;
    a shank connected to the frame assembly, the shank configured to be secured to a vehicle hitch receiver;
    a rack comprising a deck supported between a first rail and a second rail, the rack movably secured to the frame assembly, the rack further comprising a first hinge pin and a second hinge pin extending outward from the first rail;
    a ramp movably disposed within the rack between the deck and the first and second rails; and
    a tilt assembly comprising a pivot bar that is configured to selectively engage the first hinge pin and the second hinge pin, the pivot bar movable between at least three positions, a first position that restrains the first hinge pin from movement within the first pivot guide and permits the second hinge pin to move within the second pivot guide to tilt the rack about a first axis located at the first hinge pin, a second position that restrains the second hinge pin from movement within the second pivot guide and permits the first hinge pin to move within the first pivot guide to tilt the rack about a second axis located at the second hinge pin, and a lock position that restrains both the first hinge pin and the second hinge pin from movement respectively within the first pivot guide and the second pivot guide.

18. The vehicular mounted tiltable hauling device of claim 17, further comprising a handle movably secured to the pivot bar, wherein movement of the handle translates the pivot bar between the first position, second position, and the lock position.

19. The vehicular mounted tiltable hauling device of claim 17, further comprising:
    a second pivot bracket secured to the frame assembly and comprising a third pivot guide and a fourth pivot guide;
    a third hinge pin connected to the rack, extending outward from the second rail, and movably received within the third pivot guide; and
    a fourth hinge pin connected to the rack, extending outward from the second rail, and movably received within the fourth pivot guide.

20. A vehicular mounted tiltable hauling device, comprising:
    a frame assembly, the frame assembly comprising a frame tube, a first pivot bracket and a second pivot bracket, the first and second pivot brackets each comprising first and second pivot guides;
    a folding hitch adaptor with a hitch shank configured to connect to a vehicle, the frame assembly secured to the folding hitch adaptor and pivotable about the folding hitch adaptor between a first position and a second position;
    a rack comprising a deck supported between opposed rails, the rack movably secured to the frame assembly, the rack further comprising a first hinge pin and a second hinge pin extending outward from each of the opposed side rails, wherein the first and second hinge pins from each of the opposed side rails are moveably received within the first and second pivot guides of the respective first pivot bracket and second pivot bracket;

a ramp movably disposed within the rack between the deck and a ramp lip extending inward from each of the opposed rails;

rack doors secured between the opposed rails at each of the ends of the opposed rails, the rack doors close to retain the ramp within the rack and open to permit the ramp to be at least partially removed from within the rack; and a tilt assembly connected to the first pivot bracket comprises a handle connected to a pivot bar, the handle and pivot bar moveably connected to the first pivot bracket, wherein movement of the handle translates the pivot bar between at least three positions, a first position that restrains the first hinge pin from movement within the first pivot guide and permits the second hinge pin to move within the second pivot guide to tilt the rack about a first axis located at the first hinge pin, a second position that restrains the second hinge pin from movement within the second pivot guide and permits the first hinge pin to move within the first pivot guide to tilt the rack about a second axis located at the second hinge pin, and a lock position that restrains both the first hinge pin and the second hinge pin from movement respectively within the first pivot guide and the second pivot guide.

* * * * *